Sept. 5, 1939. G. HIGLEY 2,172,281
SCALE
Filed July 22, 1938
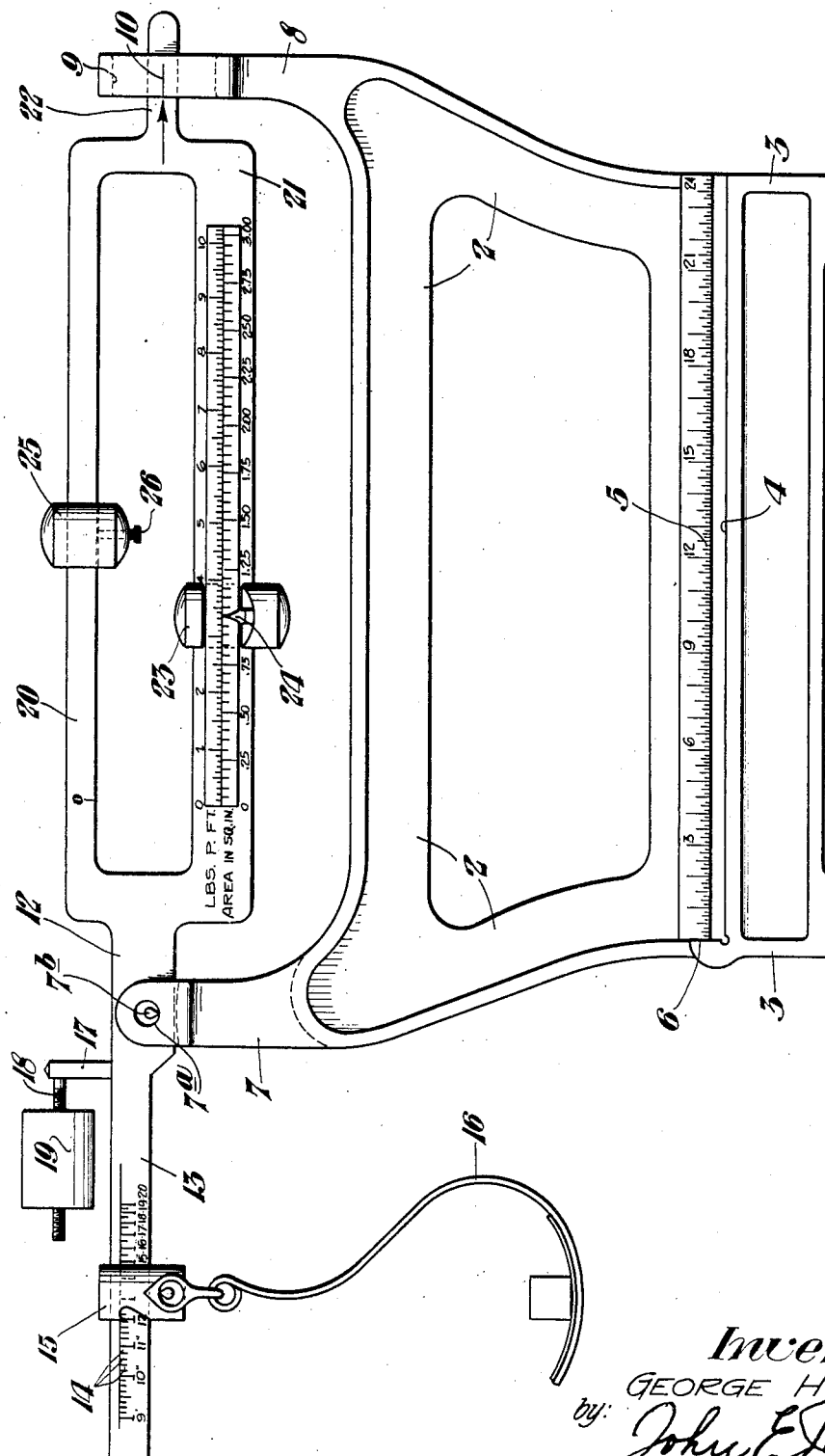
Inventor:
GEORGE HIGLEY,
by: John E Jackson
his Attorney.

Patented Sept. 5, 1939

2,172,281

UNITED STATES PATENT OFFICE 2,172,281

SCALE

George Higley, Youngstown, Ohio

Application July 22, 1938, Serial No. 220,809

6 Claims. (Cl. 265—35)

This invention relates to scales and, particularly, to an improved scale for ascertaining and indicating the weight per unit of length and the cross-sectional area of articles.

In the manufacture of rolled steel products, especially rolled structural beams and bars having irregular cross-sections, such as I-beams and the like, it is often desirable for various reasons to know the cross-sectional area of such a beam or bar and weight of the same per unit of length. Heretofore, it was necessary to weigh a short piece of the beam or bar by means of an ordinary scale and compute the cross-sectional area by multiplying the weight of the piece by the number of cubic units in a unit of the weight and dividing by the length of the piece, and to find the weight per unit of length by dividing the weight of the piece by the length thereof. Such a procedure was not only tedious and took considerable time, but there was a danger of making an error in computing.

According to the present invention, there is provided a means for determining the cross-sectional area and weight per unit of length of a piece of metal which is simple in its operation and eliminates any computing whatsoever, and, consequently, any danger of errors.

It is an object of the present invention to provide an improved type of scales which are simple and inexpensive in their construction and, at the same time, efficient and accurate in their operation.

It is another object of the invention to provide an improved type of scales which, when the length of a given piece of material or article is known, will indicate directly the cross-sectional area and the weight per unit of length.

Various other objects and advantages of this invention will be more apparent in the course of the following specification and will be particularly pointed out in the appended claims.

In the accompanying drawing, there is shown, for the purpose of illustration, one embodiment which my invention may assume in practice.

As shown in the front elevation in the drawing, the improved scales of my invention comprise a frame 2 having a base 3 on which there is arranged a flat-surfaced shelf 4 with a scale 5, preferably graduated in inches and fractions thereof, disposed therealong on the side of the frame 2. Preferably at the left end of the scale, in line with the zero mark on the scale 5, there is arranged perpendicular to the shelf 4, an end abutment or stop portion 6.

There is arranged on one side of the frame 2, an upwardly extending forked portion 7 having aligned holes 7a in the upper forked portion thereof. On the opposite side of the frame 2 there is arranged an upwardly extending portion 8 having an enlarged slot or opening 9 therein and provided with a hairline 10, preferably on the front surface thereof.

There is pivotally supported on a knife edge 7b, intermediate its ends in the aligned openings 7a of the forked portion 7 of the frame 2, a beam 12. This beam has a single extending beam portion 13 on one side of its pivot having markings or calibrations 14 suitably arranged thereon representing length, preferably in inches and fractions thereof, with a sliding poise indicator or rider 15 mounted thereon having a pan carrier or article supporting means 16 suspended therefrom, and an upwardly extending post 17 having a horizontally disposed screw 18 arranged therewith parallel to the beam 12 and having a movable counterweight 19 disposed thereon.

On the other side of the pivot, the beam 12 consists of a double beam: namely, an upper beam portion 20 and a lower beam portion 21, and an extending end portion 22 which is adapted to be disposed in the slot or opening 9 of the upwardly extending portion 8 of the frame 2 and having an arrow or hairline thereon which is adapted to align with the hairline 10 on the portion 8 of the frame when the beam 12 is properly balanced. The lower portion 21 of the beam has two sets of markings or calibrations arranged thereon, preferably one above the other, one set representing cross-sectional area, preferably in square inches and decimals thereof, and the other set representing weight per unit of length, preferably pounds-per-foot and decimals thereof. This lower portion 21 has disposed thereon a sliding poise indicator or rider 23, having an indicating pointer 24. The upper portion 20 of the beam has a zero mark only and has arranged thereon a sliding counterpoise or rider 25 for the purpose of counterbalancing the pan 16 on the opposite side of the pivot, having a set screw 26 arranged therewith for locking the rider in any desired position on that portion of the beam.

It will be understood that the markings 14 on the beam extending portion 13 are determined from the equation $LA = K = L_1A_1 = L_2A_2$, etc., in which A is the distance from the pivot or fulcrum to the mark, and L is the length of the piece or article to be weighed; for example, 12×9=108=6×18, etc., which means that a test piece of any section of nine inch length at twelve inches from the fulcrum will have the same moment as a test piece of the same section eighteen inches long and at six inches from the fulcrum.

The calibration of the scales on the lower portion 21 of the double beam is performed as follows:

The rider 15, together with the pan 16, is first removed from the extending portion of the beam 13 and the riders 23 and 25 positioned at the zero markings on their respective beam portions and the beam accurately balanced by turning the counter-weight 19. The block 15 and pan 16 are then replaced on the extending beam portion 13 and moved to the position so as to indicate twelve inches (or one foot) on the scale 14. The rider 25 on the upper portion 20 of the double beam is then moved to the right until the beam is again balanced and locked into position by means of the screw 26. A weight of 3.4 pounds, as that is the weight of a piece of steel twelve inches long having a cross-sectional area of one square inch, is then placed on the pan and the rider 23 moved to the right until the beam is again balanced. At this point, a mark is placed, preferably on the upper part of the portion 21 of the beam opposite the pointer 24 and this will represent the 3.4 reading on the pounds-per-foot scale, and a mark is also placed on the lower part of the beam 21, opposite the pointer 24, and this mark will represent one square inch of the cross-sectional area in square inches. The upper portion of the scale is then sub-divided between the zero and the 3.4 marking into thirty-four equal increments, each to designate 0.1 pound, and the remaining length of the scale on the opposite side of the 3.4 mark is correspondingly graduated. The lower part of the scale may be divided as desired, but it is preferably divided into twenty equal increments between the zero and one square inch marking, each to designate 0.05 of a square inch and the beam on the opposite side of the one square inch marking is correspondingly graduated throughout the length thereof.

After the scale has been properly marked, preferably as described, it is ready for use. To use the scale, a test piece or article having any regular or irregular cross-section is placed on the shelf 4 and the length thereof noted on the scale 5. The rider 15 on the single beam extending portion 13 is then set relative to the scale 14 so as to correspond with the length of the test piece. The rider 23 is placed at the zero position on the lower beam portion 21 and the slider 25 on the upper portion 20 moved to the right until the beam 12 is balanced. The rider 25 is then locked in position by means of the set screw 26 and the test piece or article to be weighed placed on the pan 16. After the test piece has been placed on the pan, the rider 23 is moved to the right until the beam 12 is again balanced. The scale on the lower beam 21 is then read direct: the upper scale indicating the weight of the article or test piece in pounds per foot and the lower scale indicating cross-sectional area of the article in square inches.

While I have shown and described one embodiment of my invention, it will be understood that this embodiment is merely for the purpose of illustration and description and that various other forms may be devised within the scope of my invention, as defined in the appended claims.

I claim:

1. Scales comprising a frame, a beam pivotally supported intermediate its ends on said frame, said beam having a portion on one side of its pivot provided with calibrations representing the length of the articles to be weighed, and a portion on the other side of said pivot provided with calibrations reresenting weight of the article per unit of length and the cross-sectional area of the article, a sliding indicating poise arranged on the first mentioned portion of said beam cooperating with the markings thereon to indicate the length of the article and having means carried thereby for supporting said article, and a sliding indicating poise independently and adjustably arranged on the second mentioned portion of said beam to balance the article and to indicate thereon the weight per unit of length and cross-sectional area of the same.

2. Scales comprising a frame, a beam pivotally mounted intermediate its ends on said frame, said beam having a single beam extending portion on one side of its pivot provided with calibrations representing length in inches and a double beam portion on the other side of said pivot, one portion of which is calibrated to represent pounds-per-foot and area in square inches, and the other portion of which is unmarked, a sliding poise indicator mounted on said single beam portion cooperating with the markings thereon for indicating the length of the article to be weighed and having means arranged therewith for supporting said article, a counter-poise slidably and independently mounted on the unmarked portion of said double beam for the purpose of balancing said indicating poise and said article supporting means, and a slidable indicating poise independently and adjustably arranged on the calibrated portion of said double beam for the purpose of balancing the article on said article supporting means to indicate at one setting thereof the weight of the article in pounds-per-foot and cross-sectional area thereof in square inches.

3. The combination of a beam pivotally supported intermediate its ends and provided with calibrations at one side of its pivot representing length, having an indicating poise slidably arranged thereon, an article supporting carrier associated with and carried by said indicating poise, calibrations on the other side of the pivotal support of said beam representing cross-sectional area and weight per unit of length and having an adjustable indicating poise independently and slidably arranged thereon, and an adjustable counter-poise independently arranged on the same side for balancing the weight of said first mentioned indicating poise and article supporting carrier.

4. Scales comprising a frame, a beam pivotally supported intermediate its ends on said frame, calibrations arranged on one end of said beam in terms of length of the article to be weighed, adjustable means associated with said last mentioned means for supporting the article, and independently adjustable counter-balancing means carried by the opposite end of said beam and calibrations associated therewith for indicating the weight per unit of length and the cross-sectional area of the article.

5. The combination of a beam consisting of a single beam portion disposed on one end thereof having calibrations thereon representing length and a double beam portion disposed on the opposite end thereof with one of said beams of said double beam portion having calibrations thereon representing cross-sectional area and weight per unit of length, said beam being pivotally supported between said beam portions, an adjustable indicating poise slidably arranged on said single beam portion for indicating the length of the article to be weighed, means associated with said indicating poise for supporting the article, and an independently adjustable counter-poise arranged on each of the beams of said double beam portion for the purpose of balancing the indicating poise and article holding means on said single beam portion with the said counter-poise on the calibrated beam of said double beam portion adapted to indicate at one setting thereof the weight per unit of length and the cross-sectional area of the article.

6. The combination of a beam consisting of a single beam portion disposed on one end thereof having calibrations thereon representing length and a double beam portion disposed on the opposite end thereof with one of said beams of said double beam portion having calibrations thereon representing cross-sectional area and weight per unit of length, said beam being pivotally supported between said beam portions, adjustable means associated with said single beam portion for supporting the article to be weighed and for indicating the length of the same thereon, and an independently adjustable counter-balancing means arranged upon each of the beams of said double beam portion with the counter-balancing means on the calibrated beam of said double beam portion adapted to balance the adjustable article supporting means together with the article positioned thereon and to indicate at one setting the cross-sectional area and weight per unit of length of the article and the adjustable means on the other beam of said double beam portion adapted to balance the adjustable article supporting means before the article is placed thereon.

GEORGE HIGLEY.